United States Patent
Yildiz et al.

(10) Patent No.: US 8,942,411 B2
(45) Date of Patent: Jan. 27, 2015

(54) IMAGE COMBINING

(75) Inventors: Yesna Oyku Yildiz, Ankara (TR); Douglas Q. Abraham, Topsfield, MA (US)

(73) Assignee: Analogic Corporation, Peabody, MA (US)

(*) Notice: Subject to any disclaimer, the term of this patent is extended or adjusted under 35 U.S.C. 154(b) by 413 days.

(21) Appl. No.: 12/864,647

(22) PCT Filed: Jun. 30, 2008

(86) PCT No.: PCT/US2008/068777
§ 371 (c)(1),
(2), (4) Date: Nov. 22, 2010

(87) PCT Pub. No.: WO2009/094042
PCT Pub. Date: Jul. 30, 2009

(65) Prior Publication Data
US 2011/0085695 A1 Apr. 14, 2011

Related U.S. Application Data

(60) Provisional application No. 61/062,311, filed on Jan. 25, 2008.

(51) Int. Cl.
G06K 9/00 (2006.01)
G06T 7/00 (2006.01)
G06T 11/00 (2006.01)
G06T 11/60 (2006.01)

(52) U.S. Cl.
CPC ....... *G06T 11/60* (2013.01); *G06T 2207/30112* (2013.01); *G06T 7/004* (2013.01); *G06T 11/005* (2013.01); *G06T 2207/10081* (2013.01); *G06T 2207/30232* (2013.01)

USPC .......................................... 382/100

(58) Field of Classification Search
None
See application file for complete search history.

(56) References Cited

U.S. PATENT DOCUMENTS 5,319,547 A * 6/1994 Krug et al. ........................ 705/13
5,442,672 A * 8/1995 Bjorkholm et al. ............... 378/4
(Continued)

FOREIGN PATENT DOCUMENTS

CA 2365062 A1 6/2003

OTHER PUBLICATIONS

Second Chinese Office Action in related application No. 200880125566X dated Mar. 26, 2012, pp. 1-5.
(Continued)

*Primary Examiner* — Nancy Bitar
(74) *Attorney, Agent, or Firm* — Cooper Legal Group LLC (57) ABSTRACT

One or more techniques and/or systems for combining images of objects are disclosed where an image of a first object is to be inserted into an image of a second object in such a manner as to make the insertion substantially undetectable by a human observer of the combined image. An object generator generates a substantially artifact free image of a first object. An object locator orients the first object image according to a desired insertion point in a second object image. A forward projector converts the first object image into projection space data of the first object, and a combiner combines the first object projection space data with the second object projection space data. The combined projection space data is converted to image space data by a reconstructor, and the resulting combined image space data can be displayed on a monitor for human observation.

20 Claims, 6 Drawing Sheets (56) References Cited

U.S. PATENT DOCUMENTS

| | | | |
|---|---|---|---|
| 7,356,174 B2* | 4/2008 | Leue et al. | 382/131 |
| 7,499,522 B2* | 3/2009 | Chen et al. | 378/57 |
| 7,812,851 B2* | 10/2010 | Inakura | 345/629 |
| 2005/0104603 A1* | 5/2005 | Peschmann et al. | 324/637 |
| 2005/0253867 A1* | 11/2005 | Inakura | 345/600 |
| 2005/0276468 A1* | 12/2005 | Ying et al. | 382/154 |
| 2006/0274066 A1* | 12/2006 | Ying et al. | 345/424 |
| 2008/0075226 A1* | 3/2008 | Chen et al. | 378/22 |
| 2009/0041187 A1* | 2/2009 | Peschmann et al. | 378/57 |
| 2009/0161814 A1* | 6/2009 | Wu et al. | 378/5 |
| 2010/0303319 A1* | 12/2010 | Wang | 382/131 |

OTHER PUBLICATIONS

"International Search Report and Written Opinion" cited in related application No. PCT/US2008/068777 dated Oct. 31, 2008, pp. 1-12.

"Notification Concerning Transmittal of International Preliminary Report on Patentability" Cited in related application No. PCT/US2008/068777 Dated Aug. 5, 2010, pp. 1-8.

First Chinese Office Action in related application No. 200880125566X dated Oct. 26, 2011.

Yildiz; et al., "3D threat image projection", http://spie.org/x648.html?product_id=766432, Mar. 10, 2008.

* cited by examiner

IMAGE COMBINING

BACKGROUND

Security at airports and in other travel related arenas is an important issue given today's political climate, as well as other considerations. One technique used to promote travel safety is through baggage inspection. In some instances, luggage is visually inspected and/or manually inspected by screeners. In other instances, luggage is initially scanned with some type of instrument, and then inspected further if necessary. For example, an x-ray machine may be used to provide security personnel with a substantially two dimensional view of the contents of a bag, thus enabling a determination to be made as to whether further inspection is warranted. However, it may, at times, be difficult to make judgments regarding the contents of a three dimensional object based upon a two dimensioned image (e.g., because the contents of the three dimensional item are collapsed or flattened onto one another in the two dimensional image). Moreover, the quality of decisions regarding the safety of a piece of luggage, or rather the contents thereof, is a function of the individuals making such decisions, and some individuals may be more adept at identifying threat items (e.g. gun, knife, explosive device and/or other type of weapon) than other individuals.

SUMMARY

This Summary is provided to introduce a selection of concepts simplified form that are further described below in the Detailed Description. This Summary is not intended to identify key factors or essential features of the claimed subject matter, nor is it intended to be used to limit the scope of the claimed subject matter.

As provided herein, security at airports and/or in other travel related realms may be enhanced by providing a more realistic image of an item under inspection (e.g., a piece of luggage), as well as providing a mechanism for monitoring the aptitude of an individual charged with screening for threat items. That is, a computed tomography (CT) image of an object under inspection is presented to a screener for example, and an image of one or more threat items (e.g., gun, knife, explosive device and/or other type of weapon) may be randomly placed into the image of the item under inspection to enable a determination to be made as to whether the screener picks up on these items.

Moreover, the images of the threat items are made to look as if they were actually in the item under inspection when the item under inspection was scanned by the CT scanner. That is, images of the threat items are manipulated to have artifacts consistent with artifacts in the image under inspection, where such artifacts are function of, among other things, the particular mechanical and/or electrical components of the CT scanner used to scan the item under inspection. Until now, such Threat Image Projection has been unsuccessful for numerous reasons, such as imaging cues that the screeners pick up on, which make it easy for screeners to discern the presence of an artificial or virtually inserted threat image, thus defeating the intended purpose. By way of example, imaging cues may comprise diminished artifacts where they would otherwise be expected/present and/or unnatural looking artifacts which blend into the normal bag background where there have been obvious visual discontinuities at the boundaries.

The image combining and/or image insertion techniques provided herein provide improved results generally because sinogram or projection space data is primarily manipulated instead of CT or image space data. That is, measured line integrals are primarily used instead of backprojected data which comprises the CT image. Working primarily in sinogram space allows for more plausible threat insertion.

Additionally, manipulating sinogram data also allows "ideal" images of treat objects or weapons to be created, so that a repository of substantially artifact free threat items can be populated. This provides a cost effective mechanism for producing and storing images of threat items so that different threat items can be randomly placed into images of different suitcases, for example, regardless of the CT scanners used to obtain the images of the items under inspection. That is, since the threat items are ideal or substantially artifact free, they can be readily adapted or corrupted to have artifacts consistent with artifacts generated by the particular CT scanners being used to scan the suitcases, for example. Working primarily with sinogram or projection space data also allows the images of "ideal" (e.g., of substantially artifact free) objects to be rotated or otherwise manipulated, thus making it easier to place the threat item images in suitcases, for example, at convenient locations (e.g., where there may be a void in the bag).

In one example, a system configured to insert, an image of a first object into an image of a second object comprises an object locator, a forward projector, a combiner and a reconstructor. The object locator is configured to determine at least one of a desired position in the image of the second object to insert the image of the first object and a desired orientation of the image of the first object in the image of the second object. The forward projector is configured to convert image space data of the image of the first object into first projection space data. The combiner is configured to combine the first projection space data with second projection space data of the image of the second object to generate composite projection space data. The reconstructor is configured to convert the composite projection space data into image space data. In this example, the resulting image space data can be displayed on a monitor for viewing by a human observer.

In another example, a system configured to generate substantially artifact free images of a weapon for later insertion into an image of a piece of luggage, may comprise a projection data corrector, and a reconstructor. The projection data corrector can be configured to correct projection data of the image of the weapon based on, the orientation of the weapon when it was scanned, and/or one or more characteristics of a scanner used to acquire the image. The reconstructor can be configured to convert pro action space data of the weapon image into image space data.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
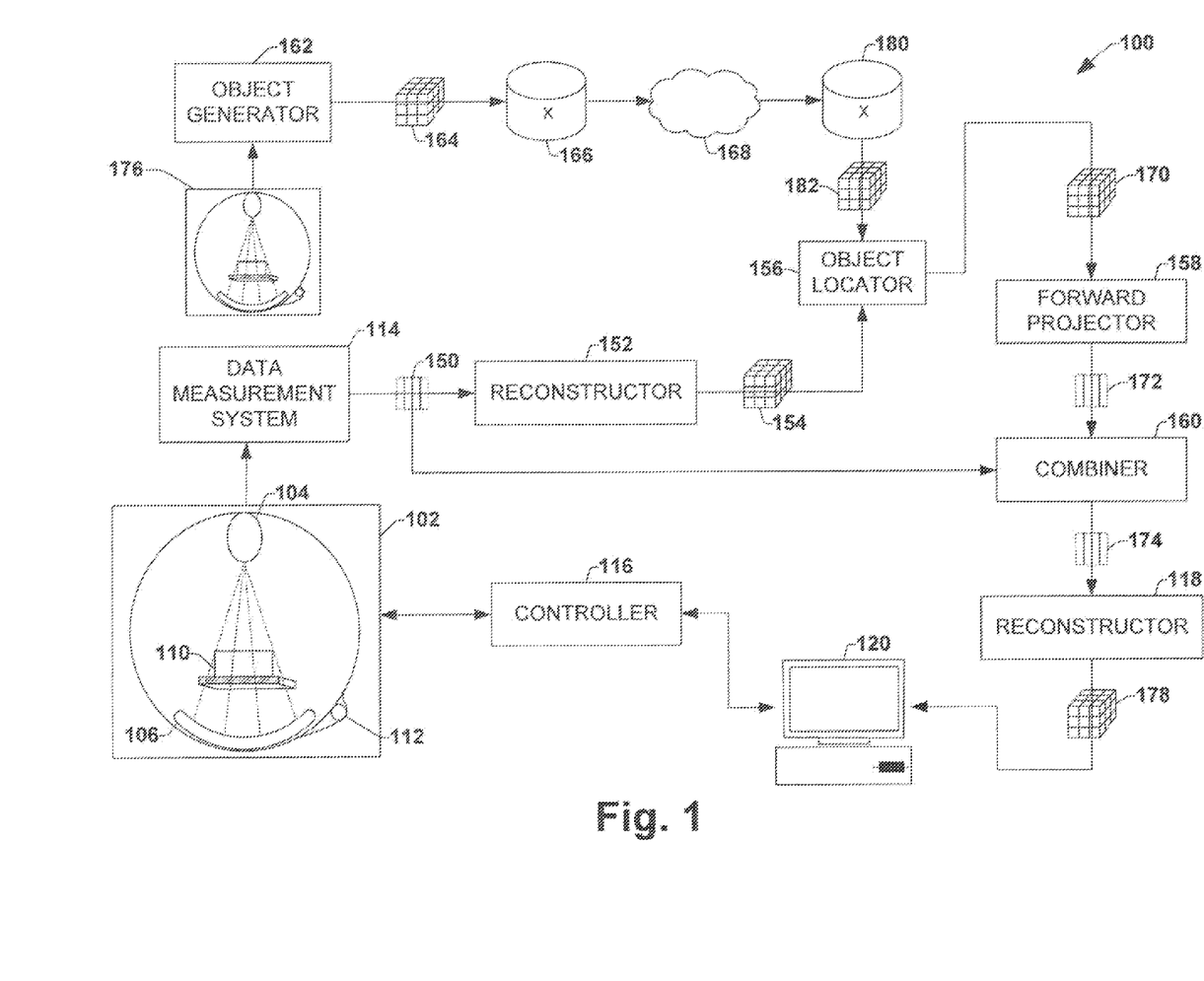
FIG. 1 is a schematic block diagram illustrating an environment wherein three dimensional (3D) image combining may be implemented as provided herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without the specific details. In other instances, structures and devices are illustrated in block diagram form in order to facilitate describing the claimed subject matter. FIG. 1 is an illustration of an example environment 100 in which a system may be employed to insert an image of a first object into an image of a second object, for exam, in such a way as to mitigate visual cues that may alert a human observer as to the insertion. In the example environment 100 an object scanning apparatus 102, such as a security scanning apparatus (e.g., used to scan luggage at an airport), may be used to scan an object 110 (e.g., a suitcase at the airport). The scanning apparatus typically comprises radiation source 104 (e.g., an X-ray tube), an array of radiation detectors 106 (e.g., X-ray detectors), and a rotator 112 (e.g., a gantry motor) for rotating the radiation source 104 and detectors 105 around the object being scanned 110.

As an example, a computer tomography (CT) security scanner 102 that includes an X-ray source 104, such as an X-ray tube, can generate a fan, cone, wedge, or other shaped beam of X-ray radiation that traverses an object 110, such as a suitcase, in an examination region. In this example, the X-rays are emitted by the source 104, traverse the examination region that contains the object 110 to be scanned, and are detected by an X-ray detector 106 across from the X-ray source 104. Further, a rotator 112, such as a pantry motor drive attached to the scanner, can be used to rotate the X-ray source 104 and detector 106 around the object 110, for example. In this way, X-ray projections from a variety of perspectives of the suitcase can be collected, for example, creating a set of X-ray projections for the object. While illustrated as a third generation system, those of ordinary skill in the art will understand that fourth generation and other implementations are also contemplated. As yet another example, the radiation source 104 and detector 106 may remain stationary while the object is rotated.

In the example environment 100, a data measurement system 114 is operably coupled to the scanning apparatus 102, and is typically configured to collect information and data from the detector 106, may be used to compile the collected data into projection space data 150 for an object 110. As an example, X-ray projections may be acquired at each of plurality of angular positions with respect to the object 110.

In the example environment 100, a reconstructor 152 is coupled to the data measurement system 114, and is configured to receive the projection space data 150 from the data measurement system 114 and generate image space data 154 indicative of the scanned object 110 using a suitable analytical, iterative, and/or other reconstruction technique (e.g., backprojecting from projection space to image space).

In one embodiment, the image space data 154 for a suitcase, for example, may ultimately be displayed on a monitor 120 for human observation. In this embodiment, an operator may isolate and manipulate the image, for example, rotating and viewing the suitcase from a variety of angle, room levels, and positions.

It will be appreciated that, while the example environment 100 utilizes the reconstructor 152 to convert projection space data to image space data, for example, for a suitcase being scanned, the techniques and systems described herein, are not limited to this embodiment in another embodiment, for example, an appropriate location and orientation of a first object to be inserted into the suitcase may be determined using projection space (instead of image space) data indicative of a suitcase.

In the example—environment 100, a scanning apparatus system 176 may send projection space data indicative of a scanned first object to an object generator 162. The object generator 162, for example, may be configured to generate substantially artifact free image space data indicative of a first object or threat item 164, such that the first object can be combined with (e.g., inserted into) a second object to create image space data indicative of the first and second objects combined. This substantially artifact free image space data indicative of the first object 164, for example, may be considered an ideal object image to be later inserted into a second object for the purpose of testing human visual detection of a threat object or otherwise training the user to identify such objects.

As an example, the scanning apparatus system 176 may scan contraband or a weapon such as a gun, knife, explosive or component thereof and create projection space data for that threat item, as described above. The object generator 162 can receive the projection space data for the scanned threat item and generate image space data for the threat item 164. In this example, the generated image space data 164 can be substantially free of artifacts that may result from the threat item (e.g. gun) scanning operation, and can be image space data that substantially isolates the threat item from non-threat item objects in the image space. Further in this example, the image space data for the threat item 164 can be generated so that it may later be inserted into an image of a suitcase, for the purpose of testing human luggage screeners at airports.

Figure 3:
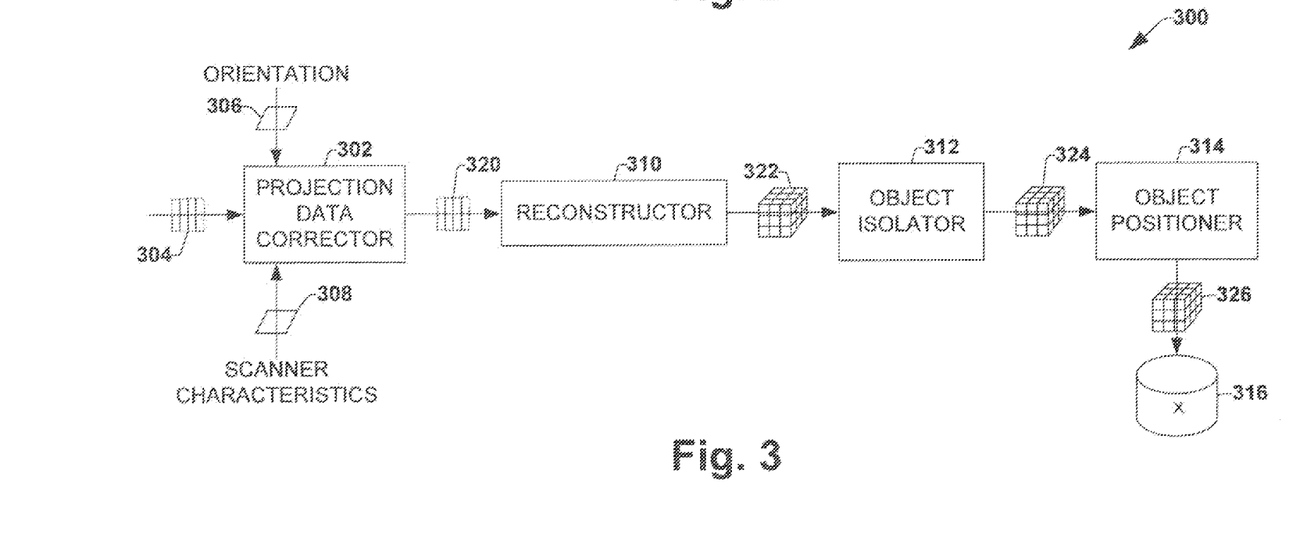
FIG. 3 is a schematic block diagram illustrating one or more components of an environment wherein a substantially artifact free image of an object may be obtained as provided herein.

FIG. 3 is a component block diagram of an example system 300, which may be configured to generate a substantially artifact free image of a weapon 326 for subsequent corruption and insertion into an image of a piece of luggage, for example, such as the object generator 162 in the example environment 100 of FIG. 1. In one embodiment, the resulting image space data 326 may be considered an ideal object image, in as much as it may be an ideal image of a weapon that can later be used for insertion into another image of an object (e.g., similar to that described above with regard to 162).

The example system 300 may comprise a projection data corrector 302, which can be configured to correct projection data 304 of the weapon based on at least one of: orientation 306 of the weapon when it was scanned by a scanner to acquire the image of the weapon; and a characteristic 308 of a scanner used to acquire the image of the weapon.

In one embodiment, for example, when an object such as a potential threat item (e.g., a gun, knife or explosive) is scanned by a scanning apparatus, the image data may include artifacts. Moreover, the artifacts may vary depending on factors, such as, the location and orientation of the object in the scanner's examination region, the design and other characteristics of the particular scanner used to acquire the projection data, the selected scan settings, and the like. Therefore, in this example, the projection data corrector 302 can correct the projection space data indicative of a threat item 304, as scanned by the scanning apparatus in a particular orientation, resulting in projection space data indicative of the threat item 320 that can yield substantially artifact-free image space data and account for Hounsfield unit restoration.

The example system 300 may also comprise a reconstructor 310, which can be configured to convert projection space data 320 indicative of the weapon into image space data 322, for example, indicative of the weapon. As an example, the reconstructor 310 can be configured to backproject the projection space data 320 indicative of a threat item, into image space data 322 indicative of the threat item.

In one embodiment, the example system 300 may also comprise an object isolator 312, which can be configured to substantially isolate the weapon from other objects of the image space data 322. As an example, when a weapon such as a gun is scanned by a scanning apparatus other objects may be present in the resulting image space data 322 as a result of the scanning process. In this example, the object isolator 312 can essentially remove substantially a of the non-threat item objects from the image space data indicative of the threat item 322, resulting in image space data indicative of a threat item without substantially any non-threat item objects 324.

In another embodiment, the example system 300 may also comprise an object positioner 314, which can be configured to situate in image space the weapon at a desired orientation in the image of the weapon e.g., as if the weapon were at the isocenter of the scanner). As an example, the image of the weapon such as a gun, may later be inserted into another image, such as a suitcase. In this example, in order to have the insertion of the gun in the suitcase appear visually natural (e.g., as if the gun was in the suitcase and they were scanned together), the orientation of the image of the gun may need to be adjusted to fit appropriately into the image of the suitcase. Further, in this example, in order to adjust the orientation of the image of the gun a true center of the image of the gun may need to be determined (e.g., the true center of a three-dimensional representation of the gun), such that, when the orientation of the image of the gun is adjusted, the position of the gun remains substantially unchanged. In this embodiment, the object positioner 314 can find the true center of the image space data indicative of the weapon 324, resulting in image space data indicative of the weapon with a true center 326.

In another embodiment, the example system 300 may also comprise a storage component 316, which can be configured to store the substantially artifact free image, for example, of the weapon. As an example, the storage component 316 may be a hard drive disk located on a computer system at a remote location, which is set up to scan a variety of weapons and other potential threat objects. In this example, the resulting mages can be stored in the computer system and later transferred to a facility that has a live threat detection system, such as an airport, where the images of the threat objects can be utilized in the threat detection system.

Turning back to FIG. 1, in the example environment 100, the image space data indicative of the first object 164 (e.g., the ideal object image) can be stored in a storage component 166 (e.g., a hard drive, diskette, CD ROM flash drive, etc.), for example, in a storage library of image space data of ideal objects. In this example, the storage component 166 may be remotely located from other components of the example environment 100. An ideal image of an object can be relayed 168 (e.g., sent over the Internet) to a second storage component 180, for example, to a storage library of image space data of ideal objects at another location.

As an example, ideal object images of potential threat items 164 (e.g., guns, explosives, knives) may be generated at a remote location and stored in an electronic database located on a series of hard drives 166 at the remote location 168 (e.g. an image scanning facility). A scanning apparatus 102 may be located at an airport, used to scan passenger luggage as passengers check in for flights. In this example, the database of ideal object images can be sent 168 to a database located on a series of hard drives 180 at the airport for use in the airport's threat detection system.

It will be appreciated that, while the object generator 162 in FIG. 1 and the exemplary system 300 are described in terms of system components, the techniques and systems, described herein, are not limited to these embodiments. In one embodiment, the object generator 162 may be computer software that allows a user to generate and/or manipulate images of ideal objects. For example, a threat object (e.g., a gun, explosive, knife) may be created using a software program that uses computer graphics to generate images (e.g., CGI software).

In FIG. 1, the example environment 100 employs an example system for inserting an image of a first object into an image of a second object. The example system can comprise an object locator 156 that is configured to determine at least one of: a desired position in the image of the second object to insert the image of the first object; and a desired orientation of the image of the first object in the image of the second object.

In one embodiment, the image of the first object may be a gun and the image of the second object may be a suitcase. In this embodiment, the object locator 156 can receive image space data indicative of the suitcase 154 and image space data indicative of the threat item 182, and use this information to determine an appropriate place in the suitcase to insert the threat item, in image space. The object locator 156 can use both sets of data 154 and 182 to determine a plausible location for the threat item to fit into the suitcase, and an appropriate orientation for the threat item to fit into the suitcase. As an example, a suitcase may contain a number of benign items typically utilized while travelling. In this example, in order to create a combined image of the threat item in the suitcase that appears natural to a human observer, the object locator 156 may identify a location in the suitcase that could fit the threat item, and orient the threat item in such a way as to fit naturally in that location.

In another embodiment, the object locator may be configured to remove items from the suitcase, for example, by manipulating image space data corresponding items to be removed from the suitcase in this example, the threat item could be oriented to fit naturally into the space in the suitcase created by removal of items.

The object locator 156, for example, can generate image space data for the first object 170 that is indicative of the first object's location and orientation in the image space of second object. In this example, image space data for the first object 170 generated by the object locator 158 may be an ideal object image of threat item, oriented in such a manner as to fit naturally into an image of a suitcase. Further, in this example, image space data for the first object 170 generated by the object locator 158 may be an ideal object image of a threat item, positioned in such a manner as to fit naturally into an image of a suitcase.

In the example environment 100, the example system can comprise a forward projector 158 configured to convert image space data 170 of the image of the first object into first projection space data 172 indicative of the first object. The forward projector 158 can be used to create projection space data indicative of the threat item 172, from the image space data indicative of the threat item 170, as if it had been scanned by the scanning apparatus.

In the example environment 100, the example system can comprise a combiner 160 configured to combine the first projection space data 172 with second object projection space data 150 of the second object to generate composite projection space data 174, for example, indicative of a combined first and second object. As an example, projection space data indicative of a suitcase 150 may have been generated by scanning the suitcase with a scanning apparatus 102 at an airport, and combining the first 172 and second projection space data 150, for example by adding corresponding projection of the projection space data. In one embodiment, a scanner can use ionizing radiation on the second object, such as a suitcase, to acquire the second projection space data. In this embodiment, the second projection space data corresponds to an interior of the second object (e.g., inside the suitcase), and may also include scanner characteristics such as energy of the ionizing radiation and a dose of the ionizing radiation.

Figure 2:
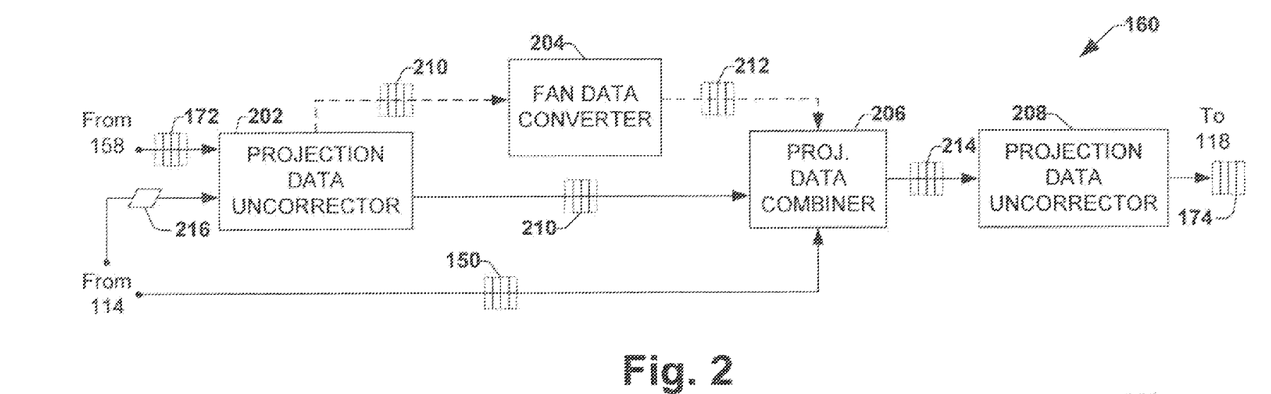
FIG. 2 is a schematic block diagram illustrating one or more components of an environment wherein three dimensional (3D) image combining may be implemented as provided herein.

FIG. 2 is a component block diagram of one embodiment of an example combiner 160. In this embodiment, the example combiner 160 can comprise a first projection data uncorrector 202, which is configured to corrupt the first projection space data 172 so that, when reconstructed from the first projection space data, the image space data of the first object includes artifacts which mimic or otherwise approximate the artifacts that would have been present had the first object actually been scanned by the first scanner 102. More particularly, for example, the first object space data may be modified based on one or more of the location or orientation of the first object, had it been actually scanned by the first scanner 102; the design or other characteristics of the first scanner 102; and the scan settings of the first scanner.

As an example, projection space data indicative of a first object 172 can be sent to the first projection data uncorrector 202 from the forward projector 158. Recall that projection space data indicative of a first object 172 may be an ideal object, for example, substantially free from artifacts. The data is corrupted in such to way that the resulting corrupted projection space data indicative of the first object 210 appears to have been generated by scanning the first object using the scanning apparatus 102.

In this way, for example, a threat item that is scanned at an offsite facility, using an offsite scanner, can appear as though it was scanned at an onsite facility scanning the suitcase, using an onsite scanner. When an object is scanned the resulting scanning data can typically have characteristics that are unique to individual scanning apparatus. These unique characteristics often appear as artifacts in the resulting image of the scanned object. In this example, without the first projection data uncorrector 202, if the threat item was scanned using a first scanner and the suitcase was scanned using a second scanner, the resulting combined image of the threat item in the suitcase may not appear natural to a human observer. Further, in the case of an ideal image, the absence of artifacts could also be a cue to the operator.

In FIG. 2, the example combiner 160 can optionally comprise a fan data converter 204, which can be configured to convert parallel projection space data of a first object 210 to fan shaped projection space data of a first object 212. In this embodiment, the fan data converter 204 may optionally be utilized when the second projection space data indicative of the second object 150 was generated using a scanner that utilizes fan-shaped energy beams to create projections of the scanned object, while the first projection space data indicative of the first object 172 is in parallel projection space. Therefore, for example, both the first and second projection space data should be fan-shaped in order to be appropriately combined.

In FIG. 2, the example combiner 160 can comprise a projection space, data combiner 206, which may be configured to combine corrupted first projection space data indicative of a first object 210 or optionally 212) and second projection space data indicative of a second object 150, creating composite projection space data indicative of a combined first and second object 214. As an example, projection space data indicative of a suitcase 150 that was generated by scanning the suitcase using a scanner at an airport, can be combined with projection space data indicative of a gun 210 (or optionally 212) that has been corrupted to appear as though it was scanned by the scanner at the airport. In this way, for example, the gun can be inserted into the suitcase, in pro action space, and they can both appear as though they were scanned by the same scanner at the same time.

In FIG. 2 the example combiner 160 can comprise a second projection data uncorrector 208, which can be configured to corrupt the composite projection space data 214 so as to generate artifacts for presentation in reconstructed image space data of the corrupted projection space data. As an example, when objects are scanned individually and the resulting projection space data is reconstructed into image space data, respective object images typically have unique artifacts associated with them. However when objects are combined and scanned together (e.g., a gun inside a suitcase) the resulting artifacts in the combined objects image may be different than that of the individually scanned objects' images. Therefore, in this example, a resulting image of a composite of two individually scanned objects may have different artifacts than an image of object scanned together.

In one embodiment, the second projection data uncorrector 208 corrupts the composite projection space data 214 indicative of the combined first object (e.g., a gun) and the second object (e.g., a suitcase), in such a that the resulting corrupted composite projection space data 174 appears to be that of the first and second object scanned together at a same time (e.g., the gun and suitcase were scanned together).

Turning beck to FIG. 1, in the example environment 100, the example system can comprise a reconstructor 118, which can be configured to convert the composite projection space data 174 into composite image space data 178. As an example, the reconstructor 118 can backproject the compote projection space data indicative of a threat item in a suitcase 174, into image space data indicative of the threat item in the suitcase 178 (e.g., data comprising a three-dimensional image showing the threat item inside the suitcase).

In one embodiment, the image space data indicative of the threat item inside the suitcase 178, for example, may be displayed on a monitor 120 for human observation. In this embodiment, an operator may isolate and manipulate the image, for example, rotating and viewing the image from a variety of angles, zoom levels, and positions, essentially seeing the threat item inside the suitcase from each of these perspectives.

Figure 4:
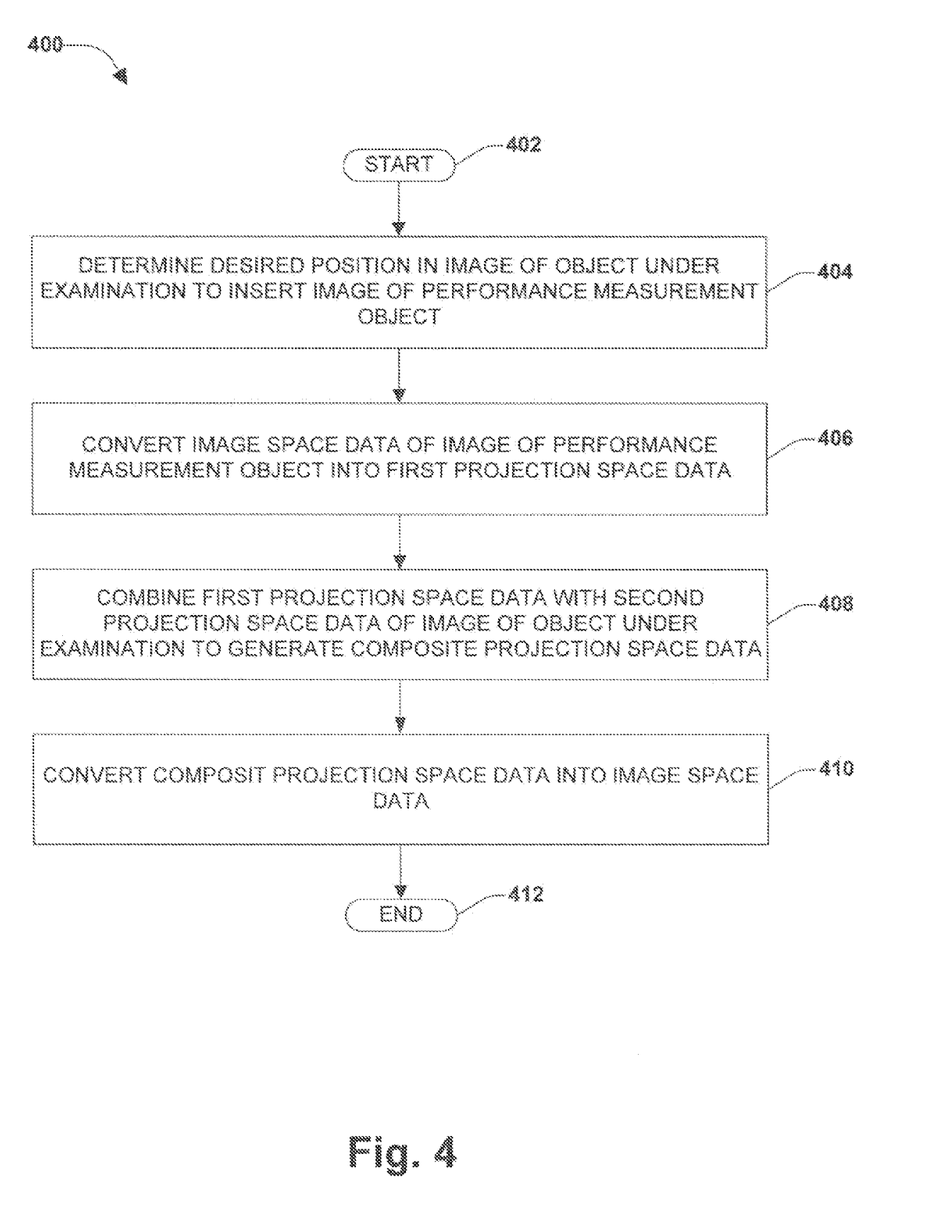
FIG. 4 is a flow chart diagram of an example method for inserting an image of a performance measurement object into en image of an object under examination.

A method may be devised for inserting an image of a performance measurement object into an image of an object under examination, such that a human observer of a combined performance measurement object and object under examination may not be able to visually detect the insertion. FIG. 4 is a flow chart diagram of an example method 400 for inserting an image of a performance measurement object into an image of an object under examination. The example method 400 begins at 402 and involves determining a desired position in the image of the object under examination to insert the image of the performance measurement object, at 404. For example, one can determine an appropriate place inside an image of a suitcase to place an image of a threat item, so that the resulting combined image appears natural (e.g., as if the threat item was inside the suitcase and they were both scanned by a scanning apparatus together).

At 406, image space data of the image of the performance measurement object is converted into first projection space data (e.g., projection space data indicative of the performance measurement object). For example, the image space data of the threat item can be converted to data that may result from the threat item being scanned by a scanning apparatus (e.g., projection space data resulting from the threat item being scanned). At 408, the first projection space data scanning data of the threat item) is combined with second projection space data of the image of the object under examination (e.g., scanning data from the suitcase) to generate composite projection space data (e.g., scanning data of the threat item inside the suitcase). As an example, the projection space data of the threat item can be combined with the projection space data of the suitcase, resulting in projection space data of the threat item in the suitcase.

At 410, the composite projection space data (e.g., indicative of the threat item in the suitcase) is converted into image space data. For example, the projection space data indicative of the threat item in the suitcase (e scanning data of a threat item in a suitcase) can be back projected to image space data, which may be used to render an image on a display. Having converted the projection space data to image space data, the example method 400 ends at 412.

Figure 5:
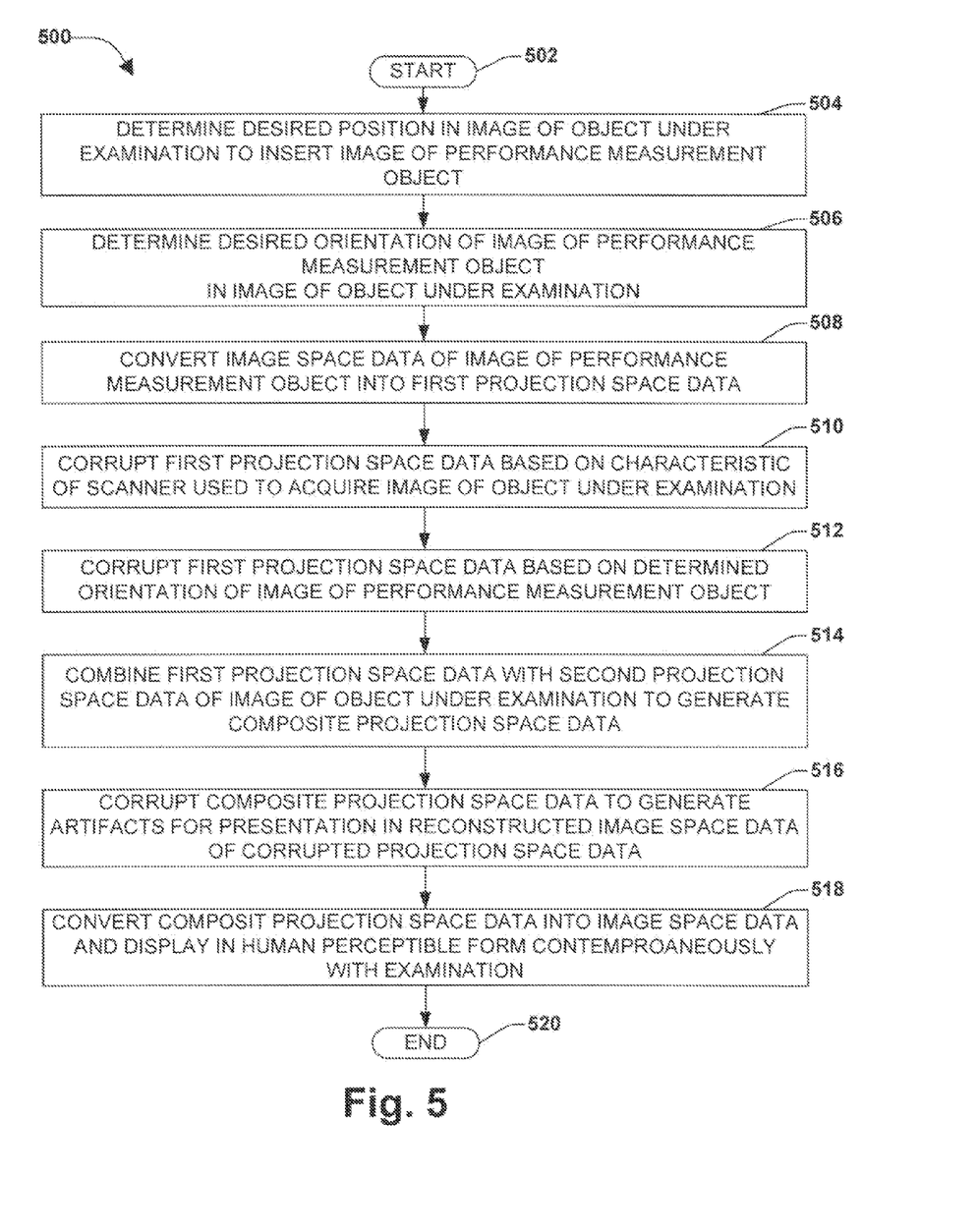
FIG. 5 is a flow chart diagram of one embodiment of an example method for inserting an image of a performance measurement object into an image of a object under examination.

FIG. 5 is a flow chart diagram of one embodiment of a method 500 for inserting an image of a performance measurement object into an image of an object under examination in this embodiment, at 504, a desired position in the image of the object under examination to insert the image of the performance measurement object is determined, such as in example method 400 at 404. At 506, a desired orientation of the image of the performance measurement object in the image of the object under examination is determined. For example, the appropriate orientation of a threat item in a suitcase can be determined, based on the position chosen to place the threat item, and the orientation of the suitcase.

At 508, image space data of the image of the performance measurement object is converted into first projection space data, such as in example method 400 at 406. At 510, the first projection space data is corrupted based on a characteristic of a scanner used to acquire the image of the object under examination. For example, projection space data indicative of a threat item can be corrupted, using one or more scanner characteristics, so that it appears the data was a result of the threat item being scanned by the scanner used to acquire the image of the object under examination.

At 512, the first projection space data is corrupted based on the determined orientation of the image of the performance measurement object. For example, when the orientation of the threat item was determined at 506, the determined orientation of the threat item can be used to corrupt the projection space data of the threat item, so that it appears that the threat item was scanned in that orientation. At 514, the first projection space date is combined with second projection space data of the image of the object under examination to generate composite projection space date, as in example method 400 at 408.

At 516, the composite projection space data is corrupted so as to generate artifacts for presentation in reconstructed image space data of the corrupted composite projection space data. As an example, when the composite projection space data is converted to image space data and presented as an image, the artifacts that may be present in the image should appear as if the threat item was inside the suitcase when it was scanned. Therefore, in this example, the composite projection space data can be corrupted in such a way that when converted to image space date, the resulting image can appear as if the threat item was in the suitcase when it was scanned.

At 518, the composite projection space date is converted into image space data, as in example method 400 at 410, and the composite image space data is displayed in human perceptible from substantially contemporaneously with the security examination. As an example, a human luggage examiner may be situated at a threat detection system located at an airport. In this example, luggage moves through a scanning apparatus and the examiner views resulting images on a display screen. In this embodiment, an image of threat item can be inserted into a suitcase that is moving through the scanning system, prior to the image of the suitcase appearing on the display monitor. In this way, the human observer may not detect that the inserted image of the threat item is not a real threat item inside the suitcase under the scanning apparatus. Having displayed the composite image, the example method 500 ends at 522.

Figure 6:
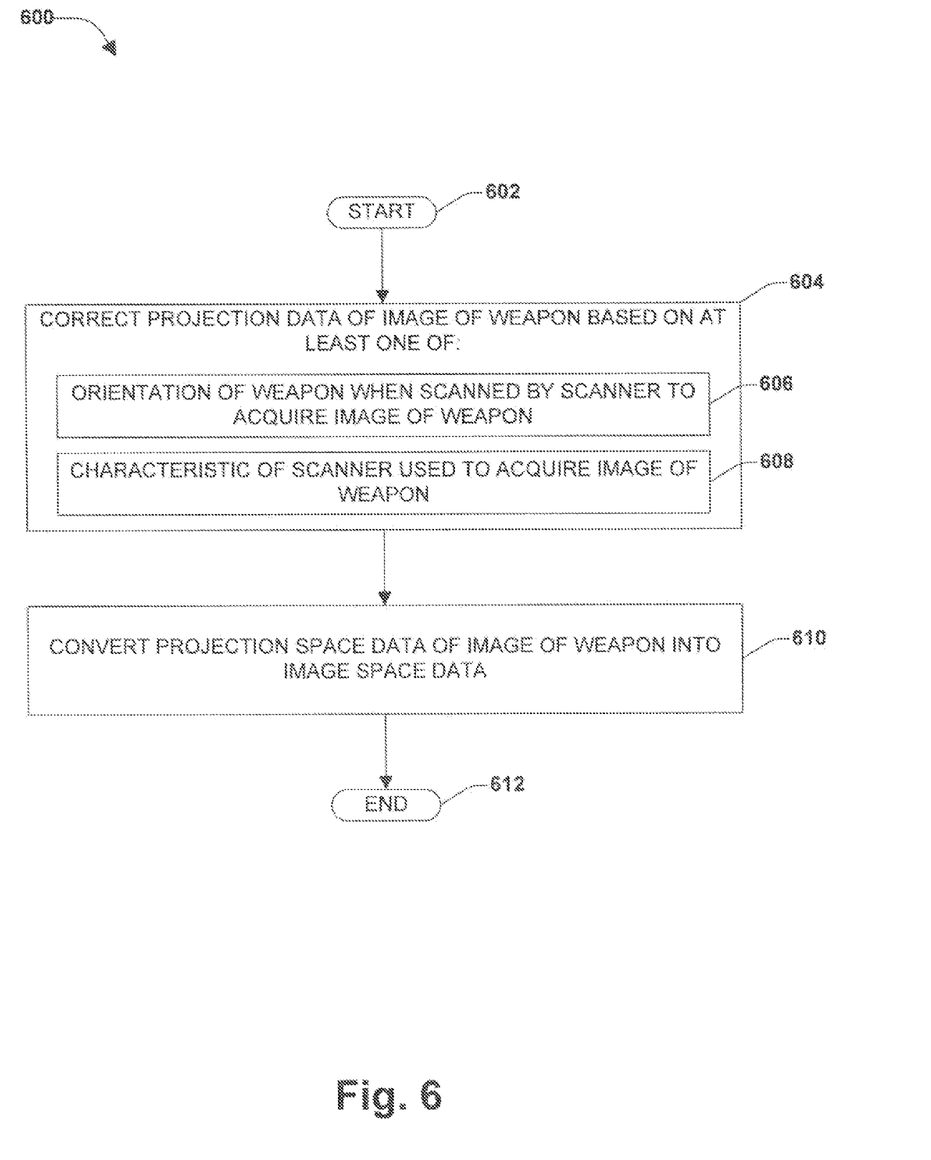
FIG. 6 is a flow chart diagram of an example method for generating a substantially artifact free image of a weapon.

A method may be devised for generating a substantially artifact free image of a weapon for subsequent corruption and insertion into an image of a piece of luggage, for example, such that image of the weapon is an ideal object image of a weapon with substantial no non-weapon objects or artifacts present in the image. FIG. 6 is a flow chart diagram of an example method 600 for generating a substantially artifact free image of a weapon for subsequent corruption end insertion into an image of a piece of luggage. The example method 600 begins at 602 and involves correcting projection data of the image of the weapon, at 604, based on at least one of the orientation of the weapon when it was scanned by a scanner to acquire the image of the weapon 606; and a characteristic of a scanner used to acquire the image of the weapon 608.

As an example, when a weapon such as a gun is scanned, the orientation of the gun during scanning can create artifacts in the resulting image that are unique to the specific orientation of the gun during scanning. Further, in this example, individual scanner can have unique characteristics that can manifest themselves as artifacts in the resulting image of a gun, scanned by that scanner. Therefore, in order to create an ideal object image of the gun, for example, one or more of these artifact creating situations can be accounted for in projection space.

In the example method 600, at 610, projection space data of the image of the weapon is converted into image space data, for example, indicative of the weapon. For example, projection space data that is a result of a gun being scanned can be back projected into image space data indicative of the gun that was scanned. Having converted the projection space data the example method 600 ends at 612.

Figure 7:
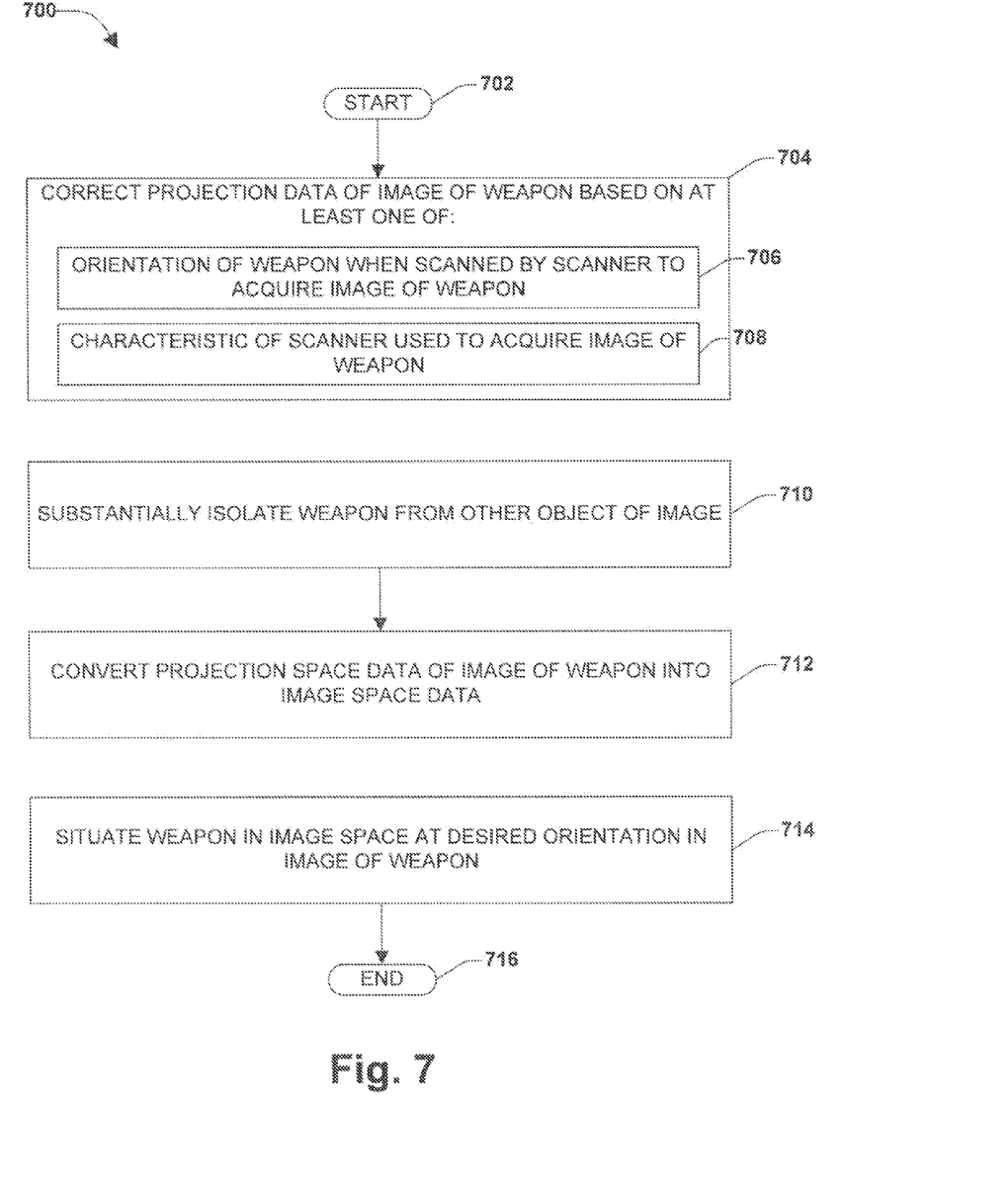
FIG. 7 is a flow chart diagram of one embodiment of an example method for generating a substantially artifact free image of a weapon.

FIG. 7 is a flow chart diagram of one embodiment of an example method 700 for generating a substantially artifact free image of a weapon for subsequent corruption and insertion into an image of a piece of luggage, such as in example method 600 of FIG. 6. The example method 700 begins at 701 and involves correcting projection data of the image of the weapon, at 704, based on at least one of: the orientation of the weapon when it was scanned by a scanner to acquire the image of the weapon 706; and a characteristic of a scanner used to acquire the image of the weapon 708, as in example method 600.

At 710, the weapon is substantially isolated from other objects of the image. For example, during scanning of a weapon such a gun, other non-gun objects may be present in the resulting image space data. In this example, the gun can be substantially isolated from the non-gun objects in the projection space data. It will be appreciated that, the weapon may also be isolated from the non-weapon objects in the image space data indicative of the weapon.

At 712, the projection space data of the image of the weapon is converted into image space data, as in example method 600 at 610. At 714, the weapon, in image space, is situated at a desired orientation in the image of the weapon. For example, a true center of an image of a weapon such as a gun can be determined so that, later, the orientation of the image of the gun may be adjusted without changing a position of the image of the gun. Having situated the image of the weapon, the example method 700 ends at 716.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "example" is used herein to mean serving as an example, instance, or illustration. Any aspect or design described herein as "example" is not necessarily to be construed as advantageous over other aspects or designs. Rather, use of the word example is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be constructed to mean "one of more" unless specified otherwise or clear from context to be directed to a singular form.

Also, although the disclosure has been shown and described with respect to one or more implementations, equivalent alterations and modifications will occur to others skilled in the art based upon a reading and understanding of this application and the annexed drawings. The disclosure includes all such modifications and alterations and is limited only be the scope of the following claims. In particular regard to the various functions performed by the above described components (e.g., elements, resources, etc.), the terms used to describe such components are intended to correspond unless otherwise indicated to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one of more other features of the other implementations as may be desired and advantageous for any given or particular application. Furthermore, to the extent that the terms "includes", "having", "has", "with", or variants thereof are used in either the detailed description of the claims, such terms are intended to be inclusive in a manner similar to the term "comprising."

What is claimed is:

1. A system configured to insert an image of a first object into an image of a second object, comprising:
   an object locator configured to determine a location in the image of the second object into which to insert the image of the first object, the image of the second object yielded from second projection space data representative of the second object, the first object not comprised within the second object during a radiation examination of the second object from which the second projection space data is acquired;
   a forward projector configured to convert, based on the location, the image of the first object from image space to projection space to generate first projection space data representative of the first object;
   a combiner configured to combine the first projection space data with the second projection space data to generate composite projection space data representative of the first object and the second object;
   a reconstructor configured to convert the composite projection space data into a reconstructed image depicting the first object within the second object at the location such that the first object appears to be comprised within the second object during the radiation examination; and
   a projection data uncorrector configured to corrupt at least one of the first projection space data or the composite projection space data, based on an aspect of the second object spatially proximate the location, to introduce an artifact into the reconstructed image.

2. The system of claim 1, comprising:
a radiation source configured to emit ionizing radiation.

3. The system of claim 1, the
projection data uncorrector configured to corrupt the least one of the first projection space data or the composite projection space data based on at least one of an energy of ionizing radiation to which the second object is exposed during the radiation examination or a dose of the ionizing radiation.

4. The system of claim 1, comprising:
a radiation source configured to emit x-ray radiation.

5. The system of claim 1, the location comprising at least one of a position or an orientation.

6. The system of claim 1, the first object comprising a threat item.

7. The system of claim 1, the system comprised within a tomographic security scanning apparatus.

8. The system of claim 1, the image of the first object being substantially artifact free.

9. A method for inserting an image of a first object into an image of a second object, comprising:
   determining a location in the image of the second object into which to insert the image of the first object, the image of the second object yielded from second projection space data representative of the second object, the first object not comprised within the second object during a radiation examination of the second object from which the second projection space data is acquired;

converting, based on the location, the image of the first object from image space to projection space to generate first projection space data representative of the first object;

combining the first projection space data with the second projection space data to generate composite projection space data representative of the first object and the second object;

converting the composite projection space data into a reconstructed image depicting the first object within the second object at the location such that the first object appears to be comprised within the second object during the radiation examination; and corrupting, prior to the converting, at least one of the first projection space data or the composite projection space data, based on an aspect of the second object spatially proximate the location, to introduce an artifact into the reconstructed image.

10. The method of claim 9, the location comprising at least one of a position or an orientation.

11. The method of claim 9, comprising:
applying ionizing radiation to the second object during the radiation examination to acquire the second projection space data.

12. The method of claim 9, the corrupting comprising:
corrupting the at least one of the first projection space data or the composite projection space data based on a characteristic of a scanner used to acquire the second projection space data.

13. The method of claim 11, the ionizing radiation comprising x-ray radiation.

14. The method of claim 9, the first object comprising a threat item.

15. An imaging system, comprising:
an ionizing radiation source configured to emit radiation;
a detector array configured to generate a signal indicative of radiation traversing a second object and impinging the detector array;
a data measurement system configured to generate second projection space data representative of the second object based on the signal;
a first reconstructor configured to generate an image of the second object based on the second projection space data;
an object locator configured to determine a location in the image of the second object into which to insert an image of a first object not comprised within the second object;
a forward projector configured to convert, based on the location, the image of the first object from image space to projection space to generate first projection space data representative of the first object;
a combiner configured to combine the first projection space data with the second projection space data to generate composite projection space data representative of the first object and the second object;
a second reconstructor configured to convert the composite projection space data into a reconstructed image depicting the first object within the second object at the location such that the first object appears to be comprised within the second object; and
a projection data uncorrector configured to corrupt at least one of the first projection space data or the composite projection space data, based on an aspect of the second object spatially proximate the location, to introduce an artifact into the reconstructed image.

16. The system of claim 15, the first reconstructor different than the second reconstructor.

17. The system of claim 15, the location comprising at least one of a position or an orientation.

18. The system of claim 15, the image of the second object comprising a three-dimensional image.

19. The system of claim 15, the radiation comprising x-ray radiation.

20. The system of claim 15, the first item comprising a threat item.

* * * * *